(12) United States Patent
Tinge et al.

(10) Patent No.: US 12,486,225 B2
(45) Date of Patent: Dec. 2, 2025

(54) PROCESS AND PLANT FOR THE PRODUCTION OF ε-CAPROLACTAM AND AMMONIUM SULFATE ON INDUSTRIAL SCALE

(71) Applicant: CAP III B.V., El Urmond (NL)

(72) Inventors: Johan Thomas Tinge, El Urmond (NL); Peter Roos, El Urmond (NL); Louise Annemarie Groot Zevert, El Urmond (NL); Anna Dite Cuiper, El Urmond (NL)

(73) Assignee: CAP III B.V., El Urmond (NL)

( * ) Notice: Subject to any disclaimer, the term of this patent is extended or adjusted under 35 U.S.C. 154(b) by 459 days.

(21) Appl. No.: 17/775,398

(22) PCT Filed: Nov. 5, 2020

(86) PCT No.: PCT/EP2020/081077
§ 371 (c)(1),
(2) Date: May 9, 2022

(87) PCT Pub. No.: WO2021/094184
PCT Pub. Date: May 20, 2021

(65) Prior Publication Data
US 2022/0402868 A1 Dec. 22, 2022

(30) Foreign Application Priority Data
Nov. 11, 2019 (EP) ...................................... 19208255

(51) Int. Cl.
*C07D 201/04* (2006.01)
(52) U.S. Cl.
CPC .................. *C07D 201/04* (2013.01)
(58) Field of Classification Search
CPC .................................................. C07D 201/04
See application file for complete search history.

(56) References Cited

U.S. PATENT DOCUMENTS

| | | | |
|---|---|---|---|
| 3,530,924 A | 9/1970 | Domning et al. | |
| 3,992,372 A | 11/1976 | Gath et al. | |
| 4,804,754 A | 2/1989 | De Decker et al. | |
| 4,806,638 A | 2/1989 | Brand et al. | |
| 7,351,820 B2 | 4/2008 | Thomissen et al. | |
| 9,908,785 B2 | 3/2018 | Tinge et al. | |
| 2011/0038781 A1 | 2/2011 | Hoffman et al. | |
| 2015/0218008 A1 | 8/2015 | Ekkelenkamp | |
| 2016/0159657 A1 | 6/2016 | Tinge et al. | |

FOREIGN PATENT DOCUMENTS

| | | |
|---|---|---|
| BY | 010840 B1 | 12/2008 |
| CN | 103896838 A | 7/2014 |
| CN | 103896840 A | 7/2014 |
| CN | 104024221 A | 9/2014 |
| CN | 103864689 | 12/2017 |
| EA | 009914 B1 | 4/2008 |
| EP | 1206411 | 10/2007 |
| GB | 748572 | 5/1956 |
| JP | 54128589 | 10/1979 |

(Continued)

OTHER PUBLICATIONS

Search Report issued by the Taiwanese Patent Office dated Sep. 9, 2024 for Application 109138088.

(Continued)

*Primary Examiner* — Golam M Shameem
(74) *Attorney, Agent, or Firm* — Honigman LLP; Andrew N. Weber; Jonathan P. O'Brien

(57) ABSTRACT

The invention provides a process and a plant for the production of ε-caprolactam and crystalline ammonium sulfate in an industrial-scale plant, wherein the plant comprises a Beckmann rearrangement reaction section, an ammonium sulfate crystallization section, and one or more heat exchangers configured to transfer heat from the Beckmann rearrangement reaction section to the ammonium sulfate crystallization section and wherein the process comprises the steps of:
  a) feeding
    (i) cyclohexanone oxime and
    (ii) oleum and/or sulfuric acid
    to the Beckmann rearrangement reaction section
  b) reacting components (i) and (ii) in the Beckmann rearrangement reaction section to form a reaction mixture comprising ε-caprolactam, whereby heat of reaction is generated;
  c) discharging the reaction mixture comprising ε-caprolactam from the Beckmann rearrangement reaction section;
  d) removing partially or fully the heat of reaction generated in the Beckmann rearrangement reaction section by one or more heat exchangers configured to transfer heat from the Beckmann rearrangement reaction section;
  e) feeding an aqueous liquid comprising ammonium sulfate to the ammonium sulfate crystallization section;
  f) introducing heat into the ammonium sulfate crystallization section comprising the aqueous ammonium-sulfate-comprising liquid by one or more heat exchangers configured to transfer heat into the ammonium sulfate crystallization section;
  g) forming ammonium sulfate crystals by evaporative crystallization in the ammonium sulfate crystallization section;
characterized in that
  h) the heat of reaction removed from the Beckmann rearrangement reaction section in step d) is at least partially or fully transferred to the ammonium sulfate crystallization section in step f).

11 Claims, 3 Drawing Sheets

(56) References Cited

FOREIGN PATENT DOCUMENTS

| JP | 2010-163319 | 7/2010 |
| TW | 201213303 A | 4/2012 |
| WO | 2012019674 A2 | 2/2012 |
| WO | 2014/206869 | 12/2014 |
| WO | 2015/010885 | 1/2015 |
| WO | 2021/094184 | 5/2021 |
| WO | 2021/156371 | 8/2021 |

OTHER PUBLICATIONS

Decision to Grant issued by the Belarus Patent Office dated Sep. 26, 2024 for Application a 20220149.
Badrian A.S. et al. Caprolactam Production, Moscow. "Khimiya", 1977, p. 207.
Badrian A.S. et al. Caprolactam Production, Moscow. "Khimiya", 1977, pp. 158 to 167 and 207 to 214.
Office Action, Russian Application 2022115565, dated Oct. 6, 2023.
Badrian A.S. et al., Caprolactam Production, Moscow. "Khimiya". 1977, p. 264 ff.
First Examination Report dated Aug. 9, 2024 for IN 202217026958.
Office Action dated Aug. 2, 2024 for BY 20220149.
International Search Report for PCT/EP2014/062987 mailed Oct. 21, 2014.
International Search Report for PCT/EP2021/052670 mailed Apr. 23, 2021.
Kawakami, Tadao, "Industrial application of nonaqueous solution chemistry", Chemical Engineering, vol. 23, No. 2, 1959, p. 45.
International Search Report for PCT/EP2020/081077 mailed May 20, 2021.
Chinese Office Action, Application No. 2023102800365280, issued Oct. 28, 2023.
Wenjie Ren et al., "Introduction to the Beckman Rearrangement Reaction in the Caprolactam Industry" Guangzhou Chemical, vol. 21, Issue 18, Sep. 30, 2013, pp. 44-45, 48.

PROCESS AND PLANT FOR THE PRODUCTION OF ε-CAPROLACTAM AND AMMONIUM SULFATE ON INDUSTRIAL SCALE

CROSS REFERENCE TO RELATED APPLICATIONS

This U.S. nonprovisional application is the 35 USC § 371 national phase of PCT Application No. PCT/EP2020/081077, filed on Nov. 5, 2020, which claims the benefit of EP Application Serial No. 19208255.0, filed on Nov. 11, 2019. Each of these documents is hereby incorporated by reference in its entirety.

DETAILED DESCRIPTION

Figure 1A:
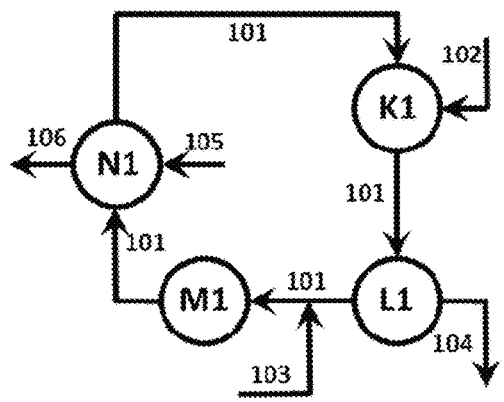
FIG. 1a is a schematic diagram illustrating an example of a single-stage Beckmann rearrangement reaction section as described below.

The invention relates to a process for producing ε-caprolactam by Beckmann rearrangement from cyclohexanone oxime and recovering crystalline ammonium sulfate in an energy-efficient manner.

ε-Caprolactam (also called: caprolactam) is an important organic chemical raw material, mainly used in the production of polyamide 6 (also called: nylon 6). It is well-known that ε-caprolactam can be prepared by liquid phase Beckmann rearrangement of cyclohexanone oxime in the presence of oleum, a mixture of sulfuric acid and $SO_3$ (see Ullmann's Encyclopedia of Industrial Chemistry, 2018, Chapter on 'Caprolactam').

Such liquid phase Beckmann rearrangement processes can be carried out, e.g., in a continuous process, by admixing cyclohexanone oxime to a reaction mixture comprising already-formed ε-caprolactam, sulfuric acid and $SO_3$. In such process, the sulfuric acid and $SO_3$ is a catalyst for the conversion of cyclohexanone oxime towards caprolactam, which is known to occur almost instantaneously. The Beckmann rearrangement reaction is a highly exothermic reaction and needs to be controlled by a cooling system. Cyclohexanone oxime is produced on commercial scale by various cyclohexanone oxime formation processes, such as the 'HPO® process', the 'ammoximation process', the 'Raschig process', the 'NO hydrogenation in sulfuric acid process' and the 'photonitrosation process'. In the 'HPO® process', nitrate or nitrogen oxides are converted into hydroxylamine which is reacted with cyclohexanone into cyclohexanone oxime; in the 'ammoximation process', cyclohexanone is converted with hydrogen peroxide and ammonia into cyclohexanone oxime; in the 'Raschig process', cyclohexanone is converted with hydroxylamine into cyclohexanone oxime; in the 'NO hydrogenation in sulfuric acid' process, nitrogen oxide (NO) is converted into hydroxylamine which is reacted with cyclohexanone into cyclohexanone oxime; and in the 'photonitrosation process', cyclohexane is converted to cyclohexanone oxime dihydrochloride (see Ullmann's Encyclopedia of Industrial Chemistry, 2018, Chapter on 'Caprolactam').

After the rearrangement reaction occurs, a base, preferably aqueous ammonia, is added to the Beckmann rearrangement mixture to produce a neutralized Beckmann rearrangement mixture. The neutralized Beckmann rearrangement mixture is phase-separated into an aqueous ammonium sulfate phase and a crude ε-caprolactam phase. The ammonium sulfate phase is extracted with solvent to remove residual amounts of ε-caprolactam. The ammonium sulfate solution is then steam stripped to remove solvent and sent to an ammonium sulfate recovery unit. Pure ε-caprolactam is recovered from the crude ε-caprolactam phase by a series of purification steps, which usually includes extraction, distillation and concentration steps.

Aqueous ammonium sulfate solutions are not only formed in the neutralization of the Beckmann rearrangement mixtures, but also in some older cyclohexanone oxime formation processes. For example, in the 'Raschig process', up to 2.7 tons of ammonium sulfate are coproduced per ton cyclohexanone oxime; in the 'NO hydrogenation in sulfuric acid process', it is about 0.7 ton of ammonium sulfate per ton cyclohexanone oxime (see Ullmann's Encyclopedia of Industrial Chemistry, 2018, Chapter on 'Caprolactam').

Ammonium sulfate recovery units typically contain one or more evaporative crystallization units. Aqueous ammonium sulfate solutions that are co-produced in ε-caprolactam production processes typically contain about 60 wt. % water and about 40 wt. % ammonium sulfate. When these aqueous ammonium sulfate solutions are fed to an evaporative crystallization unit, about 1.5 tons of water have to be evaporated per ton of crystalline ammonium sulfate. This means that the heater(s) that is/are operated in conjunction with the evaporative crystallizer must be charged with circa 1.5 tons of external steam per ton of produced crystalline ammonium sulfate. Usually, this external steam is generated in a boiler house, which burns fossil fuels such as natural gas, oil or coal. Thus, ammonium sulfate crystallization requires a considerable amount of heat, and therefore energy. The costs of the external steam usage determine to a large extent the operating costs of the ammonium sulfate recovery unit.

In practice, two or more evaporative crystallization units are often combined into a multiple-effect configuration in order to conserve steam. In a multiple-effect configuration, water is boiled in a sequence of evaporative crystallization units, each held at a lower pressure than the previous one. Because the boiling temperature of water decreases as pressure decreases, the vapor boiled off in one evaporative crystallization unit can be used to heat the next, and only the first evaporative crystallization unit (at the highest pressure) requires an external source of steam. In theory, a reduction of almost 75% of the amount of required external steam can be reached, in the case of a four stage multiple-effect configuration. In practice, the realized reduction will be somewhat lower. However, the costs of the residual external steam consumption are still high in relation to the market price of the produced crystalline ammonium sulfate.

In addition, it has been a desire for a long time to substitute the steam produced in the fossil-fuel-fired boiler houses for a different steam from an external source that is ecologically more favorable and/or has a lower economic value. There is in general a desire to lessen the overall carbon footprint of polyamide 6 and its intermediates and coproducts.

In order to be useful, the condensation temperature of such a substitute steam must be higher than the temperature in the evaporative crystallization unit or in case of a multiple-effect configuration higher than the temperature in the first evaporative crystallization unit. And, in order to reduce both the costs and the carbon footprint of the produced crystalline ammonium sulfate significantly, the supply availability of this substitute steam should be sufficiently high to replace (preferably a large fraction of the) external steam that is currently being used.

In general, the temperature of the liquid phase Beckmann rearrangement reaction mixture is maintained in the temperature range of from about 75° C. to about 110° C. Higher temperatures result in lower caprolactam yields and higher byproducts formation. Lower temperatures give lower reaction rates and much higher viscosities of the reaction mixture. To maintain the temperatures of the Beckmann rearrangement reaction mixtures in the desired temperature range of from about 75° C. to about 110° C., heat is removed (and the system thereby cooled) via one or more heat exchangers. Normally, in these heat exchangers, cooling water is used as coolant. So, the reaction heat is transferred to the cooling water. The temperature of the cooling water should be (preferably much) lower than the temperatures of the Beckmann rearrangement reaction mixtures in order to be able to absorb heat from the Beckmann rearrangement reaction mixtures. In the prior art heat exchanger systems operated in Beckmann rearrangement reaction sections, cooling water enters the heat exchanger(s) at a certain temperature, then it takes up heat and leaves the heat exchanger(s) again as a higher-temperature liquid. Afterwards it is cooled again (e.g., in a cooling tower) and is returned to the heat exchanger in the Beckmann rearrangement reaction section. Thus, normally water is not evaporated in the heat exchangers of Beckmann rearrangement reaction systems.

There have been attempts to use the heat produced in the Beckmann rearrangement reaction in a more economically attractive manner, but not in the way that the present invention does.

For example, DD147538 describes a process for the concentration of aqueous caprolactam solutions by evaporation of water, whereby the required energy originates from the Beckmann rearrangement reaction. The aqueous caprolactam solutions are charged as coolant to the heat exchangers that lower the temperature of the Beckmann rearrangement reaction mixture.

CZ277997 also describes a process for the concentration of aqueous caprolactam solutions by evaporation of water, whereby the required energy originates from the Beckmann rearrangement reaction. CZ277997 applies a special type of heat exchanger, i.e., an evaporator-type heat exchanger and preferably a film-evaporator-type heat exchanger.

U.S. Pat. No. 3,992,372 also describes and claims the usage of heat of reaction of the Beckmann rearrangement reaction for concentrating aqueous caprolactam solutions. In U.S. Pat. No. 3,992,372, the aqueous caprolactam solutions originate from the aqueous extraction in a polyamide 6 plant.

CN103896840 describes and claims a process for the concentration of an organic solvent-caprolactam solution by distillative evaporation of the organic solvent. The heat of reaction from the Beckmann rearrangement section is transferred via a heat exchanger to the distillation section by charging the organic solvent-caprolactam solution as coolant to the heat exchanger of the Beckmann rearrangement section.

Although the above-mentioned applications may have some economic advantages over applying just cooling water as coolant, they still have some important disadvantages. In these prior art applications impure aqueous and/or organic solutions are charged to the heat exchanger(s) in the Beckmann rearrangement reaction section in order to remove the reaction heat of the Beckmann rearrangement reaction. A first disadvantage is fouling of the heat exchanger(s) due to precipitation as a result of heating-up of these impure solutions. As a consequence, heat transfer from the Beckmann rearrangement reaction is gradually reduced and thus the capacity of the Beckmann rearrangement reaction and, as a consequence, the capacity of the whole caprolactam-producing plant is reduced over time. Cleaning of fouled heat exchangers is a complex activity that may cause a lot of downtime of the Beckmann rearrangement reaction section, and thus of the whole caprolactam-producing plant, causing additional reduction of production output.

A second important disadvantage of applying such impure aqueous and/or organic solutions instead of (cooling) water as coolant is that the thermal conductivity of such impure aqueous and/or organic solutions as coolant is much lower than that of (cooling) water. As a consequence, for such impure aqueous and/or organic solutions as coolant, much larger sized heat exchangers are required compared to (cooling) water as coolant for a Beckmann rearrangement reaction section with a fixed capacity. So, the investment costs of a Beckmann rearrangement reaction section with such impure aqueous and/or organic solutions as coolant will be higher than one with (cooling) water as coolant.

It is an object of the invention to overcome the above-mentioned disadvantages of the prior art. In particular, it is an object of the invention to provide a process for producing ε-caprolactam and recovering crystalline ammonium sulfate in an energy-efficient manner, while still remaining industrially feasible. It is a further object of the invention to provide production processes for ε-caprolactam and crystalline ammonium sulfate products, which have a reduced carbon footprint, while still allowing for their production at a competitive price.

These objects are solved by the claimed invention. The present inventors found that all of these objects can be achieved by transferring heat from the Beckmann rearrangement reaction section to a section wherein crystalline ammonium sulfate is produced by evaporative crystallization. It has to be kept in mind that the heat-exchanger systems and flows of energy cannot be easily manipulated for test-purposes on industrial-scale caprolactam-producing plants. For this reason, innovative solutions to the above-stated objects have been rather limited. In addition, whereas these objects have been important goals in the industry for a long time, and whereas Beckmann rearrangement reactions and ammonium sulfate crystallization have been run in parallel for an even longer time, so far section might be used effectively in the ammonium sulfate crystallization section. One reason for this is that, as explained above, the Beckmann rearrangement reaction typically needs to be run in a temperature range of from about 75° C. to about 110° C. to achieve best results. On the other hand, evaporative ammonium sulfate crystallization is usually operated at much higher temperatures (typically between 105° C. and 135° C.)

to effectively evaporate the water in the aqueous ammonium sulfate solutions, at least in the first effect of a multiple-effect crystallization system as explained above. To reach these much higher temperatures in the evaporative ammonium sulfate crystallization section, a high-temperature heating source in the evaporative ammonium sulfate crystallization section is required that has even a higher temperature in order to be able to introduce heat in the evaporative ammonium sulfate crystallization section. Thus, there was a general belief that the heat that is transferrable from an industrial-scale Beckmann rearrangement reaction section would be insufficient to replace the steam that is usually needed as high-temperature heating source in the evaporative ammonium sulfate crystallization section. The inventors found out in the research and development that led up to the present invention that the concerns were unwarranted and that a satisfactory, more economical and ecologically friendly process can be achieved by transferring the heat of reaction removed from a Beckmann rearrangement reaction section to an ammonium sulfate crystallization section as described in claim 1. In addition, the inventors developed additional improvements, which are set out in the dependent claims and further herein below.

With the process of the present invention, heat generated in the Beckmann rearrangement reaction section can be effectively re-used in the process for crystallization of ammonium sulfate. As a consequence, the need to use steam produced in, e.g., a fossil-fuel-fired boiler house can be completely or largely avoided in the ammonium sulfate crystallization process. In this way, not only the costs, but also the overall carbon footprint of polyamide 6 and its intermediates and coproducts such as ammonium sulfate can be significantly reduced.

The present invention provides a process for the production of ε-caprolactam and crystalline ammonium sulfate in an industrial-scale plant, wherein the plant comprises a Beckmann rearrangement reaction section, an ammonium sulfate crystallization section, and one or more heat exchangers configured to transfer heat from the Beckmann rearrangement reaction section to the ammonium sulfate crystallization section, wherein the process comprises the steps of:
- a) feeding
  - (i) cyclohexanone oxime and
  - (ii) oleum and/or sulfuric acid
  - to the Beckmann rearrangement reaction section
- b) reacting components (i) and (ii) in the Beckmann rearrangement reaction section to form a reaction mixture comprising ε-caprolactam, whereby heat of reaction is generated;
- c) discharging the reaction mixture comprising ε-caprolactam from the Beckmann rearrangement reaction section;
- d) removing partially or fully the heat of reaction generated in the Beckmann rearrangement reaction section by one or more heat exchangers configured to transfer heat from the Beckmann rearrangement reaction section;
- e) feeding an aqueous liquid comprising ammonium sulfate to the ammonium sulfate crystallization section;
- f) introducing heat into the ammonium sulfate crystallization section comprising the aqueous ammonium-sulfate-comprising liquid by one or more heat exchangers configured to transfer heat into the ammonium sulfate crystallization section;
- g) forming ammonium sulfate crystals by evaporative crystallization in the ammonium sulfate crystallization section;

characterized in that
- h) the heat of reaction removed from the Beckmann rearrangement reaction section in step d) is at least partially or fully transferred to the ammonium sulfate crystallization section in step f).

The present invention further provides a plant suitable for carrying out this process, said plant comprising a Beckmann rearrangement reaction section and an ammonium sulfate crystallization section; characterized in that the plant comprises one or more heat exchangers configured to transfer heat from the Beckmann rearrangement reaction section to the ammonium sulfate crystallization section. The plant suitable for carrying out the process of the invention and said process of the invention are inextricably linked. Thus, whereas herein, many features will be further explained and advantageous embodiments specified with respect to the process, it is to be understood that they all also apply and refer to the claimed plant embodiments.

Finally, the present invention provides crystalline ammonium sulfate obtained by a process as defined herein.

The process and plant of the present invention are particularly beneficial because less cooling water is required to reduce the temperature in the Beckmann rearrangement reaction section. Further, less heat is required from a source external to the process to evaporate water in the ammonium sulfate crystallization section. The reduced consumption of heat from a source external to the process, and the reduced demand for cooling water result in lower costs, less energy consumption and a reduced carbon foot print.

The process of the invention is carried out on an industrial scale, i.e., using an industrial scale plant. By industrial scale is meant a production rate, or a plant capable of operating at a production rate, of at least 1,000 kg of ε-caprolactam per hour and at least 1,000 kg of crystalline ammonium sulfate per hour, more preferably at least 5,000 kg of ε-caprolactam per hour and at least 5,000 kg of crystalline ammonium sulfate per hour and most preferably at least 10,000 kg of ε-caprolactam per hour and at least 10,000 kg of crystalline ammonium sulfate per hour.

The process of the invention typically is a continuous process. The term "continuous process," as used herein, refers to a process, which includes two or more process steps (or unit operations), such that the output from one process step flows directly into the next process step in the process, without interruption and/or without the need to collect the entire volume of the output from a process step before performing the next process step. In other words, in case of a continuous process, as described herein, it is not necessary to complete a process step before the next process step is started, but the process fluids, and if present also the intermediate heat exchange fluid, is continuously moving through the process steps that refer to it. "Continuous" can thus be understood to be the opposite of a "batch"-process. In the process of the invention, two or more process steps can be performed concurrently for at least a portion of their duration. Usually, if the process of the invention is running as a continuous process, all of steps a) to h) are performed concurrently. It is therefore not helpful to assign a particular order to the process steps in a continuous process. In a continuous process there is an order in space in contrast to a batch process that has an order in time. In particular, in the present disclosure, no alphabetical order of the process steps is intended.

In step a) of the process of the invention, (i) cyclohexanone oxime and (ii) oleum and/or sulfuric acid are fed to the Beckmann rearrangement reaction section, where in step b) the Beckmann rearrangement reaction takes place. This results in heat of reaction being generated and a reaction mixture comprising ε-caprolactam being formed. In step c), the reaction mixture comprising ε-caprolactam is discharged from the Beckmann rearrangement reaction section. In the process of the invention, conventional Beckmann rearrangement reaction sections can be used for performing steps a) to c). Preferably, a loop reactor is used, which comprises a circulating reaction mixture, to which (i) cyclohexanone oxime and (ii) oleum and/or sulfuric acid are fed and from which a mixture comprising ε-caprolactam is withdrawn. Such loop reactors are, e.g., described in WO 2004/103964 A1.

Even more preferably, a multiple-stage Beckmann rearrangement process is performed in the Beckmann rearrangement reaction section of the invention. This helps to reduce the amount of coproduced ammonium sulfate in the neutralization step after the liquid phase Beckmann rearrangement process. WO 2004/103964 A1 discloses such a multiple-stage continuous process for preparing caprolactam by Beckmann rearrangement of cyclohexanone. In a preferred embodiment of the invention, the multiple-stage Beckmann rearrangement process comprises the steps of a) feeding (i) oleum and (ii) cyclohexanone oxime into a first reaction mixture comprising caprolactam, sulfuric acid and $SO_3$, b) feeding (iii) a portion of the first reaction mixture and (iv) cyclohexanone oxime into a second reaction mixture comprising caprolactam, sulfuric acid and $SO_3$, c) withdrawing a portion of the second reaction mixture. A two stage rearrangement is obtained in case the portion that is withdrawn of the second reaction is charged to a neutralization step. In a three stage rearrangement embodiment, the process comprises a) feeding (i) oleum and (ii) cyclohexanone oxime into a first reaction mixture comprising caprolactam, sulfuric acid and $SO_3$; b) feeding (iii) a portion of the first reaction mixture and (iv) cyclohexanone oxime into a second reaction mixture comprising caprolactam, sulfuric acid and $SO_3$; c) withdrawing a portion of the second reaction mixture; d) feeding (v) a portion of the second reaction mixture and (vi) cyclohexanone oxime into a third reaction mixture comprising caprolactam, sulfuric acid and $SO_3$; e) withdrawing a portion of the third reaction mixture; and wherein the portion that is withdrawn of the third reaction is charged to a neutralization step.

In such multiple-stage rearrangement processes, the liquid phase Beckmann rearrangement in each stage is preferably carried out in a circulating reaction mixture comprising caprolactam, sulfuric acid and $SO_3$ by continuously feeding cyclohexanone oxime and, separately therefrom, oleum (first stage) resp. the amount of the circulating reaction mixture withdrawn from the previous stage (if any) to the circulating reaction mixture and by continuously withdrawing an amount of the circulating reaction mixture equivalent to the amount of cyclohexanone oxime and the amount of oleum (first stage) resp. the amount of the circulating reaction mixture withdrawn from the previous stage (if any) introduced to the circulating reaction mixture and by continuously feeding said amount to the next stage (if any). In the last stage of a multiple-stage rearrangement process, a portion of the circulating reaction mixture is withdrawn equivalent to the amount of cyclohexanone oxime and the amount of the circulating reaction mixture withdrawn from the previous stage introduced into the circulating reaction mixture of the last stage; from said portion caprolactam is recovered. The first reaction mixture, the second reaction mixture, and the optional third reaction mixture comprise caprolactam, sulfuric acid and $SO_3$. Such multiple-stage Beckmann rearrangement processes that are useful in the present invention are also described in connection with FIGS. 1b, 1c and 3 herein below.

When the Beckmann rearrangement reaction section is a multiple-stage Beckmann rearrangement reaction section, the heat of reaction removed from the Beckmann rearrangement reaction section in step d) is preferably removed from the first stage of the Beckmann rearrangement reaction section. This is particularly economical as the amount of heat that is produced in the first step is much higher than in the next one(s).

In single stage or multiple-stage liquid phase Beckmann rearrangement processes, in each stage the (circulating) reaction mixtures comprise caprolactam, sulfuric acid and $SO_3$. For the embodiments of the invention in which a multiple-stage Beckmann rearrangement process is used, the following further preferred features apply. The first reaction mixture (first stage), the second reaction mixture (second stage), and the optional third reaction mixture (third stage) comprise caprolactam, sulfuric acid and $SO_3$. The molar ratio M of a reaction mixture is defined as $(n_{SO3}+n_{H2SO4})$ $n_{Cap}$, wherein $n_{SO3}$=quantity of $SO_3$ in reaction mixture, in mol (1 mol $SO_3$ corresponds to 80 g), $n_{H2SO4}$=quantity of $H_2SO_4$ in reaction mixture, in mol (1 mol $H_2SO_4$ corresponds to 98 g) and $n_{Cap}$=quantity of caprolactam in reaction mixture, in mol (1 mol caprolactam corresponds to 113 g).

The molar ratio M of the reaction mixtures is preferably between 1 and 2.2, more preferably between 1.1 and 1.9. The molar ratio M is preferably different in each reaction mixture. The molar ratio M in the first, second and, if applicable, third reaction mixture will, as used herein, be referred to as M(1), M(2) and M(3), respectively. Preferably, M(2) is lower than M(1). Preferably M(3) is lower than M(2). In a preferred embodiment, M(1) is between 1.2 and 2.2, preferably between 1.4 and 1.9, more preferably between 1.5 and 1.8. In a preferred embodiment M(2) is between 1.0 and 1.6, preferably between 1.2 and 1.5. In a preferred embodiment M(3) is between 1.0 and 1.4, and preferably between 1.0 and 1.3. As used herein, the value for M refers in particular to the value in the reaction mixture obtained after feeding of the cyclohexanone oxime into the reaction mixture. Preferred values for M can be obtained by feeding cyclohexanone oxime to the different stages in appropriate amounts, and by applying appropriate quantities of oleum of appropriate concentration of $SO_3$.

The concentration of $SO_3$ in the reaction mixtures comprising caprolactam, sulfuric acid and $SO_3$ is preferably higher than 6 wt. %, more preferably higher than 8 wt. % and even more preferably higher than 10 wt. %. For practical reasons, the concentration of $SO_3$ in the reaction mixtures is usually less than 20 wt. %, for instance less than 18 wt. % or less than 17 wt. %. With concentration of $SO_3$ (expressed in wt. %) is meant the amount of $SO_3$ (expressed in grams) relative to the total amount (expressed in grams) of reaction mixture comprising sulfuric acid, $SO_3$ and caprolactam. The concentration of $SO_3$ is preferably different in each reaction mixture. The concentration of $SO_3$ in the first, second, and, if applicable, third reaction mixture will, as used herein, be referred to as $C_{SO3}(1)$, $C_{SO3}(2)$ and $C_{SO3}(3)$, respectively. Preferably, $C_{SO3}(1)$ is between 3 and 20 wt. %, preferably higher than 5 wt. % and more preferably higher than 6 wt. %. Increased values for $C_{SO3}(1)$ have the advantage that $C_{SO3}(2)$ can be kept high in the second reaction mixture without having to feed oleum to the second reaction mixture.

$C_{SO_3}(1)$ is preferably less than 18 wt. % and even more preferably less than 17 wt. %. Preferably, $C_{SO_3}(2)$ is between 2 and 20 wt. %, more preferably higher than 6 wt. %, more preferably higher than 8 wt. %. $C_{SO_3}(2)$ is preferably less than 18 wt. % and even more preferably less than 16 wt. %. Preferably, $C_{SO_3}(3)$ is between 4 and 18 wt. %, preferably higher than 6 wt. %, more preferably higher than 8 wt. %. $C_{SO_3}(3)$ is preferably less than 17 wt. % and even more preferably less than 16 wt. %. As used herein, the concentration of $SO_3$ refers in particular to the concentration of $SO_3$ in the reaction mixture obtained after feeding of the cyclohexanone oxime into the reaction mixture. Preferred values for the concentration of $SO_3$ can be obtained by feeding cyclohexanone oxime to the different stages in appropriate amounts, and by applying appropriate quantities of oleum of appropriate concentration of $SO_3$.

The temperature at which the liquid phase Beckmann rearrangement is carried out is preferably between 70° C. and 125° C., more preferably at a temperature of between 75° C. and 110° C. If a multiple-stage process is used, the temperature is preferably different in each reaction mixture. The temperature in the first, second and, if applicable, third reaction mixture will, as used herein, be referred to as T(1), T(2) and T(3), respectively. Preferably T(1) is between 70° C. and 125° C., more preferably between 75° C. and 115° C., even more preferably between 75° C. and 110° C. Preferably T(2) is between 70° C. and 125° C., more preferably between 75° C. and 115° C., even more preferably between 75 and 110° C. Preferably T(3) is between 70° C. and 125° C. and more preferably between 75° C. and 115° C., even more preferably between 70° C. and 110° C. As used herein, the temperature refers in particular to the value in the reaction mixture obtained after feeding of the cyclohexanone oxime into the reaction mixture.

The reaction mixture comprising ε-caprolactam that is discharged in step c) typically is subjected to a subsequent neutralization reaction with a base, preferably aqueous ammonia, which is added to the Beckmann rearrangement reaction mixture to produce a neutralized Beckmann rearrangement mixture. In a preferred embodiment, the neutralized Beckmann rearrangement mixture is then phase-separated into an aqueous ammonium sulfate phase and a crude ε-caprolactam phase. In a further preferred embodiment, this aqueous ammonium sulfate phase, optionally after further extraction and/or purification steps such as steam stripping and/or pH-adjusting steps such as dosing ammonia or sulfuric acid, is the aqueous liquid comprising ammonium sulfate that is referred to in step e) and that is fed to the ammonium sulfate crystallization section in the process of the invention. This has the advantage that the heat of reaction as well as co-products from one and the same production process are used in a particularly efficacious way. The crude ε-caprolactam phase is typically worked up by a series of purification steps, which usually includes extraction, distillation and concentration steps, to yield pure ε-caprolactam.

Preferably, the cyclohexanone oxime that is fed to the Beckmann rearrangement reaction section in step a) is formed in a cyclohexanone oxime formation process selected from the group consisting of 'Raschig process', 'NO hydrogenation in sulfuric acid process', 'HPO® process', 'ammoximation process' and 'photonitrosation process'. More preferably, cyclohexanone oxime that is fed to the Beckmann rearrangement reaction section is formed in a cyclohexanone oxime formation process selected from the group consisting of 'Raschig process', 'NO hydrogenation in sulfuric acid process', 'HPO® process', and 'ammoximation process'. These processes were found to produce particularly high quality cyclohexanone oxime.

Beckmann rearrangement is a highly exothermal process that in the prior art needed to be controlled by a cooling system. Also according to the invention, the temperature of the Beckmann rearrangement reaction mixture should be maintained in a temperature range of about 70° C. to about 125° C., preferably from about 75° C. to about 110° C. According to the present invention, the prior art conventional cooling systems are at least partially replaced by heat exchangers that remove heat of reaction from the Beckmann rearrangement reaction section and transfer it (directly or via an intermediate heat transfer fluid) to the ammonium sulfate crystallization section instead of (only) to cooling water as in the prior art. Next to the heat exchangers recited in step d), the Beckmann rearrangement reaction according to the invention can also include one or more cooling systems to additionally control the temperature of the Beckmann rearrangement reaction. In a preferred embodiment of the invention, the Beckmann rearrangement section, or where a multiple-stage Beckmann rearrangement process is used, at least the first stage of the multiple-stage Beckmann rearrangement process does not, besides the one more heat exchangers recited in step d), utilize a cooling system using cooling water. This has the advantage that heat of reaction is used in a more effective way than heating cooling water.

According to the invention, the ammonium sulfate crystallization section recited in steps e) to f) contains one or more evaporative crystallization units. In a preferred embodiment, the one or more evaporative crystallization units are selected from the group consisting of Oslo (fluidized bed) crystallizers, draft tube baffle (DTB) crystallizers, and forced circulation crystallizers or mixtures thereof. Oslo or fluidized bed crystallizers are particularly preferred. They allow for high yields and large crystal particle sizes. In step g) of the process of the invention, ammonium sulfate crystals are formed by evaporative crystallization in the ammonium sulfate crystallization section. Afterwards, the ammonium sulfate crystals can be recovered in one or more mother liquor/crystalline ammonium sulfate separation units (e.g., centrifuges). Typically, a subsequent drying of the ammonium sulfate crystals in one or more drying units (e.g., fluidized beds) is performed as well. In a preferred embodiment, the liquid comprising ammonium sulfate recited in steps e) and f) is an ammonium sulfate solution, i.e., a solution comprising ammonium sulfate. Typically, this liquid or solution comprises ammonium sulfate in an amount of 30 wt. % to 45 wt. %, more typically in an amount of 40 wt. % to 44 wt. %. Typically, the remainder is mostly water. The liquid or solution comprising ammonium sulfate is therefore an aqueous liquid or solution comprising ammonium sulfate. In one embodiment, the liquid comprising ammonium sulfate comprises water and ammonium sulfate in an amount of more than 95 wt. %, in particular more than 97.5 wt. %. The remainder can be organic and/or inorganic impurities.

Crystallization by evaporation requires heat input (typically in the form of steam) to evaporate the aqueous solvent and concentrate the remaining solution. In a preferred embodiment of the invention, two or more evaporative crystallization units are combined into a multiple-effect configuration and together make up the ammonium sulfate crystallization section. This multiple-effect configuration is advantageous, because it allows to conserve the heat required for evaporative crystallization. In a multiple-effect configuration, the aqueous solvent is evaporated in a sequence of evaporative crystallization units, each held at a lower pressure than the last. Because the boiling temperature of water decreases as pressure decreases, the vapor boiled off in one evaporative crystallization unit can be used to heat the next, and only the first evaporative crystallization unit (at the highest pressure) requires an external source of heat. In the prior art this external heat source was steam, most often generated by a fuel-based boiler house. The present invention allows to reduce or completely get rid of this external steam consumption needed for evaporative crystallization of ammonium sulfate in the prior art. This is achieved by steps d), f) and h) of the process of the invention. According to the invention, the heat of reaction from the Beckmann rearrangement reaction is transferred via heat exchangers to the ammonium sulfate crystallization section. Surprisingly, the inventors found that this can partially or even fully substitute for the steam required in the prior art for evaporative crystallization. When a multiple-effect configuration of crystallizers is used in the ammonium sulfate crystallization section of the invention, then in step f) the heat is introduced into at least the evaporative crystallization unit that is operated at the highest temperature. Accordingly, in a preferred embodiment of the invention, the ammonium sulfate crystallization section comprises two or more evaporative crystallization units operating at different temperatures, wherein in step f) the heat is introduced into the evaporative crystallization unit that is operated at the highest temperature.

The hallmark of the present invention is that heat of reaction is at least partially or fully transferred from the Beckmann rearrangement reaction section to the ammonium sulfate crystallization section by one or more heat exchangers. This is the subject of steps d), f), and h) of the process of the invention. The term "heat exchanger" as used herein is a device for transferring heat from one fluid stream to another. A heat exchanger may be direct (wherein the fluid streams are mixed) or indirect (wherein the fluid streams remain separated by a dividing wall). All heat exchangers referred to herein are indirect heat exchangers. An indirect heat exchanger comprises at least two chambers with a dividing wall. In its simplest form it comprises two chambers. Heat is transferred from a fluid in a first chamber, through the dividing wall, to a fluid in a second chamber. Each chamber independently may have a long pathway, and a large surface area to volume ratio to facilitate heat transfer. Indirect heat exchangers are well-known to the person of skill in the art. Examples of indirect heat exchangers suitable for the present invention are shell and tube, plate, and tubular type heat exchangers. According to the invention, particularly good results can be achieved when the one or more heat exchangers in steps d) and/or f) are shell and tube or a plate indirect heat exchanger. A plate indirect heat exchanger is preferred, because it is capable of handling a large flow and allows a small Log Mean Temperature Difference (LMTD) between the liquids between which heat is transferred. A horizontal shell and tube indirect heat exchanger is particularly preferred, because it is robust due to its shape. A vertical shell and tube, in particular a falling film, indirect heat exchanger is particularly preferred for steam generation by evaporation of water.

An in-process heat exchanger, as used herein, is an indirect heat exchanger wherein a process fluid from one part of the process transfers heat to a process fluid in another part of the process. Process fluid as used herein means fluid comprising reactants, products or byproducts of the Beckmann rearrangement reaction. Particularly relevant process fluids according to the invention are the Beckmann rearrangement reaction fluid, i.e., the reaction mixture containing ε-caprolactam recited in step b), and the aqueous ammonium-sulfate-comprising liquid that is used in steps e) to g). For example, in the process of the invention, an in-process indirect heat exchanger can be used to perform steps d), f), and h) at the same time. In this embodiment, Beckmann rearrangement reaction fluid transfers heat through the wall of an in-process indirect heat exchanger to the liquid comprising ammonium sulfate that shall or is undergoing evaporative crystallization in the ammonium sulfate crystallization section. In this embodiment, no intermediate heat transfer fluid is being used.

Steps d) and f) can therefore refer to the same or two different heat exchangers or sets of one or more heat exchangers. In the embodiments in which steps d) and f) refer to the same one or more heat exchangers, these are in-process indirect heat exchangers as just described herein before. In the embodiments in which steps d) and f) refer to different (sets of) one or more heat exchangers, they are still connected in a way that heat is transferred from the Beckmann rearrangement reaction section to the ammonium sulfate crystallization section. Usually, in this embodiment, an intermediate heat transfer fluid is required to transfer the heat of reaction removed from the Beckmann rearrangement reaction section by the one or more heat exchanger recited in step d) to the other one or more heat exchangers recited in step f), and thereby to the ammonium sulfate crystallization section. Practical experiments have shown that the intermediate heat transfer fluid can travel long ways through pipes. Thus, the one or more heat exchanger recited in step d) and the one or more heat exchangers recited in step f) need not be in close proximity, although this is of course beneficial with regards to energy and cost savings.

In one embodiment of the present invention, the one or more heat exchangers referred to in step d) are the same one or more heat exchangers referred to in step f). In this embodiment, each of the one or more heat exchangers at the same time remove heat from the Beckmann rearrangement reaction section and introduce heat into the ammonium sulfate crystallization section. In these embodiments, typically no intermediate heat transfer fluid is used to transfer heat from the Beckmann rearrangement reaction section to the ammonium sulfate crystallization section. Such heat transfer from the Beckmann rearrangement reaction section to the ammonium sulfate crystallization section can, e.g., be achieved through a wall of an indirect in-process heat exchanger. For example, in its simplest form, a joint wall of the Beckmann rearrangement reaction section and the ammonium sulfate crystallization section, if these are directly touching each other, can function as the heat exchanger. Usually, however, the term "heat exchanger" as used herein means an apparatus that is connected to but distinct from the actual reactor(s) in the Beckmann rearrangement reaction section and the crystallizer in the ammonium sulfate crystallization section. While preferred, close proximity of the Beckmann rearrangement reaction section and the ammonium sulfate crystallization section is not necessarily required, as liquid from one of these sections can be transferred via pipes and pumps to come into contact with a wall of the other section, e.g., through one or more heat exchangers installed there. For example, the reaction mixture comprising ε-caprolactam resulting from step b) may be transferred from the Beckmann rearrangement reaction section to a place where it comes into direct contact with a wall of the ammonium sulfate crystallization section (this is best accomplished via one or more heat exchanger installed there); or fluid comprising aqueous ammonium sulfate may be transferred from the ammonium sulfate crystallization section to a place where it comes into direct contact with a wall of the Beckmann rearrangement reaction section (again, this is best accomplished via one or more heat exchangers installed there); or both may be transferred to a separate location, where they indirectly contact each other, typically through a wall of one or more heat exchangers. In one embodiment of the invention, the mixture comprising ε-caprolactam resulting from step b) is passed through a first chamber of an indirect heat exchanger and fluid comprising aqueous ammonium sulfate is passed through a second chamber of the indirect heat exchanger, whereby steps d), f), and h) are fulfilled within this one heat exchanger. Of course, also multiple such in-process heat exchangers can be employed.

In an alternative embodiment of the present invention, an intermediate heat transfer fluid is used to at least partially or fully transfer the heat of reaction in step h), i.e., from the Beckmann rearrangement reaction section to the ammonium sulfate crystallization section. Heat transfer fluid, as used herein, means any liquid or gaseous fluid or mixtures thereof that can transfer heat from one heat exchanger to another. In the present disclosure it is called intermediate heat transfer fluid because it is the intermediate between the one or more heat exchangers used in step d) and the one or more heat exchangers used in step f) of the method of the present invention if these are not one and the same one or more heat exchangers as in the embodiments described herein above. Preferably, the intermediate heat transfer fluid is a liquid (e.g., water, oil, an aqueous or an organic solution, a molten salt) and/or vapors thereof. The term 'vapor' is used herein to refer to the at least partially gaseous form of the respective liquid. For example, a vapor as defined herein may be a saturated gas phase, but may also be a gas phase with small liquid drops. In a preferred embodiment, the term 'vapor' as used herein, refers to steam (i.e., evaporated water). Particularly good results are achieved if the intermediate heat transfer fluid is a liquid-gas system, in particular a water-steam system. This means that in the process of the invention the intermediate heat transfer fluid is present as a liquid (e.g., water) and a gas (e.g., steam). In a preferred embodiment, the intermediate heat transfer fluid changes its aggregate state during the process of the invention, in particular, during step h). In a particular preferred embodiment of the invention, the intermediate heat transfer fluid is a liquid that is at least partially evaporated in the heat exchange recited in step d), i.e., at least partially converted into a gas, and at least partially condensed in the heat exchanger recited in step f) of the method of the invention. Evaporation of the intermediate heat transfer fluid is a particularly efficient way to remove heat of reaction in the one or more heat exchangers installed in the Beckmann rearrangement reaction section and recited in step d). The generated vapors can also be particularly efficiently channeled to the one or more heat exchangers in the ammonium sulfate crystallization section recited in step f). In vapor form, the temperature of the intermediate heat transfer fluid can also be increased by particularly advantageous technology such as compression or fans, which is not possible for liquids. Finally the generation of vapor as intermediate heat transfer fluid in the heat exchangers recited in step d) allows the heat exchangers in step f) to condense the heat transfer fluid again, which is one of the most efficient ways of heat transfer across the wall of a heat exchangers.

In a preferred embodiment, the intermediate heat transfer fluid is the water-steam system, in particular water containing a low content of solids and ions (e.g., steam condensate or deionized water). This has the advantage that the intermediate heat transfer fluid can be recycled in the continuously running process over and over again, without deposits forming during the frequent evaporation in the heat exchangers of step d). Such deposit formation can lead to substantial fouling and need for cleaning of the heat exchangers which requires unwanted downtime of the plant. In this way, condensate or deionized water is also different from regular cooling water, which is not free of deposits as it usually is not evaporated. Cooling water often is stored in large open tanks or towers, necessitating the addition of antimicrobial agents. This is not necessary for the intermediate heat transfer fluid of the invention, which is kept in a closed circulation, and preferably, undergoes cycles of condensation and evaporation.

However, besides water, also other heat transfer fluids known to the skilled person can be used, as long as they are able to transfer heat from the heat exchangers mentioned in step d) to those mentioned in step f). Examples of suitable alternative intermediate heat transfer fluids are organic compounds, in particular thermal oils (e.g., Dowtherm heat transfer fluids) and halogenated organic compounds. These can in particular be selected form the group consisting of Dowtherm™ A fluid, Dowtherm™ Q fluid, Dowtherm™ SR-1 fluid.

The intermediate heat transfer fluid may be a liquid which is heated in the Beckmann rearrangement reaction section and cooled in the ammonium sulfate crystallization section. It may also be a liquid which is at least partially evaporated in the Beckmann rearrangement reaction section (in the one or more heat exchangers of step d)) and optionally, but preferably, at least partially condensed in the ammonium sulfate crystallization section (in the one or more heat exchangers of step f)). In a preferred embodiment, the heat transfer fluid that is charged to the one or more heat exchangers configured to transfer heat into the ammonium sulfate crystallization section in step f) is in a gaseous state. In a preferred embodiment, the intermediate heat transfer fluid is water which is at least partially evaporated in the one or more heat exchangers of step d) and optionally, but preferably, at least partially condensed in the one or more heat exchangers of step f). Heat is very efficiently transferred, in particular needing rather small-sized equipment, in case gaseous heat transfer fluid is condensed at a surface. In such a case, heat is transferred at the boiling/condensation point temperature.

For the avoidance of doubt, the "intermediate heat transfer fluid", as used herein, is not a "process fluid", as used herein. In particular, it is not a component of the Beckmann rearrangement reaction or the ammonium sulfate crystallization; rather it is a separate component.

A particular advantage of the arrangement without an intermediate heat transfer fluid is that the efficiency of the heat exchange is higher than when an intermediate heat transfer fluid is used. Accordingly, for a given temperature of the mixture comprising ε-caprolactam resulting from step a), the fluid comprising aqueous ammonium sulfate can be heated to a higher temperature than when an intermediate heat exchange fluid is used.

A particular advantage of the arrangement in which an intermediate heat transfer fluid is used is that intermediate heat transfer fluid can be heated to a higher temperature level prior to transferring heat in the ammonium sulfate crystallization section. This may be necessary or advantageous if the temperature at which heat of reaction that can be removed from the Beckmann rearrangement reaction is not high enough to heat the intermediate heat transfer fluid to temperatures that are most effective in facilitating ammonium sulfate crystallization. According to a preferred embodiment of step h) of the invention, an intermediate heat transfer fluid is used to transfer heat from the one or more heat exchangers recited in step d) to the one or more heat exchangers recited in step f) and the temperature of this intermediate heat transfer fluid coming from the one or more heat exchangers recited in step d) is further increased before it enters the one or more heat exchangers recited in step f). This is especially advantageous in cases in which the heat transfer fluid is (at least partially) evaporated in the Beckmann rearrangement reaction section. In these cases the pressure and the temperature of the vapors can be simply increased by thermal or mechanical vapor compression (e.g., fans). Practical experiments have shown that water is a particularly useful heat transfer fluid in the process of the invention. Thermal Vapor Compression (TVC) utilizes a steam booster or an ejector as central part of the technology. The vapors that are generated in the evaporator are combined with high-pressure steam in the booster, and the resulting vapor stream discharged by the booster is the energy driving the evaporation process. Mechanical vapor compression (MVC) utilizes compression of the vapors, which are generated in the evaporator, to a higher pressure/temperature, and their subsequent reuse for heating of the process. It is well-known that compression of a gas or vapor leads to temperature increase. In the case of MVC, the compression is achieved by high-speed centrifugal compressors or two or three fans arranged in series. According to the invention, a preferred way of further increasing the temperature of the intermediate heat transfer fluid is by one or more of the following:

a) thermal vapor compression,
b) mechanical vapor compression,
c) one or more high-speed centrifugal compressors and/or
d) one or more fans arranged in series.

In a further embodiment of the invention, the intermediate heat transfer fluid after evaporation in the one or more heat exchangers recited in step d), and after the further increase in temperature, but before it enters the one or more heat exchangers recited in step f), is de-superheated partially or fully. Super-heated vapor at a certain pressure is vapor that has a temperature that is higher than the condensation or boiling temperature of the vapor at that pressure. In such a situation, removing heat from super-heated vapor is possible without that the vapor starts to condensate. Heat transfer of super-heated vapor is relatively poor and requires large heat exchanger surface areas. The inventors found that it is in many cases more economical to de-superheat the intermediate heat transfer fluid before it enters the one or more heat exchangers recited in step f) and condenses there. In a preferred embodiment, the de-superheating of the gaseous intermediate heat transfer fluid is achieved by the addition of intermediate heat transfer fluid condensate. Advantageously, this can be the intermediate heat transfer fluid condensate obtained when gaseous intermediate heat transfer fluid condensates in the one or more heat exchangers recited in step f). For example, in case water that is evaporated to steam is used as intermediate heat transfer fluid, the de-superheating can simply be achieved by adding water that will vaporize and lower the temperature of the steam. Intermediate heat transfer fluid condensate as used herein refers to the liquid phase produced by the condensation of gaseous intermediate heat transfer fluid. For example, water is steam condensate. Both the gaseous heat transfer fluid as well as its condensate may contain impurities.

The embodiments involving de-superheating the gaseous intermediate heat transfer fluid are explained in the following again for the preferred intermediate heat transfer fluid of the invention, water. Once water is heated to its boiling point, it vaporizes and turns into saturated steam. When saturated steam is heated above the boiling point of water, dry steam is created and eventually all traces of moisture are erased. This is called superheated steam. Lowering the temperature of superheated steam to a temperature above its boiling point does not revert it back to its original liquid state. Dropping the temperature of saturated steam, however, will revert it back to its old form of water droplets. Super-heated steam has more energy and can work harder than saturated steam, but the heat content is much less useful. This is because superheated steam has the same heat transfer coefficient as air, making it an insulator and poor conductor of heat. For the process of the invention, therefore, saturated steam or steam that is only slightly superheated is preferred over superheated steam for the state of the intermediate heat transfer fluid that enters the one or more heat exchangers recited in step f).

Preferably, when water is used as the intermediate heat transfer fluid, superheated steam is generated, which is de-superheated to its saturated condition by addition of water (e.g., steam condensate) before entering the one or more heat exchangers recited in step f).

As described above, the heat transfer fluid that is charged to the one or more heat exchangers recited in step f) is preferably in a gaseous state. The temperature of the heat transfer fluid that is charged to the one or more heat exchangers recited in step f) is preferably from 35° C. to 150° C., more preferably from 85° C. to 140° C., even more preferably from 100° C. to 130° C. In practice, good results are achieved if the temperature of the heat transfer fluid that is charged to the one or more heat exchangers configured to transfer heat into the ammonium sulfate crystallization section is from 55° C. to 150° C. The pressure of the heat transfer fluid that is charged to the one or more heat exchangers recited in step f) is preferably from 1 kPa to 1 MPa, more preferably from 10 kPa to 0.8 MPa. The relationship between pressure and boiling temperature is well-known. For example, at 1 atm (ca. 101,325 Pa) the boiling point of water is 100° C.; at higher pressures the boiling point goes up.

The features described above in connection with the process of the invention, also apply mutatis mutandis to the plant of the invention, which is suitable for carrying out the process of the invention. In its simplest form, said plant comprises a Beckmann rearrangement reaction section and an ammonium sulfate crystallization section; as well as one or more heat exchangers configured to transfer heat from the Beckmann rearrangement reaction section to the ammonium sulfate crystallization section. As explained above, these one or more heat exchangers recited in steps d) and f) can either be the same or different. In case the process carried out by the plant of the invention involves an intermediate heat transfer fluid, the plant of the invention will comprise piping that is configured to transport the intermediate heat transfer fluid different from the one or more heat exchangers used in step d) to the one or more heat exchangers used in step f). In a preferred embodiment, the plant also comprises a further section in this piping, which can further increase the temperature of the intermediate heat transfer fluid, as described above, and optionally also a de-superheating section for the intermediate heat transfer fluid, as also described above. The section capable of further increasing the temperature of the intermediate heat transfer fluid can, e.g., comprise a thermal vapor compressor, a mechanical vapor compressor, one or more high-speed centrifugal compressors and/or one or more fans arranged in series. Both the section capable of further increasing the temperature of the intermediate heat transfer fluid, as well as the de-superheating section for the intermediate heat transfer fluid are located between and connected via piping to the one or more heat exchangers recited in steps d) and f).

The invention has the advantage that no heat originating from fuel needs to be introduced in the process by one or more heat exchangers configured to transfer heat into the ammonium sulfate crystallization section. In particularly, no heat originating from fuel needs to be introduced into the ammonium sulfate crystallization section. If no or only very little heat originating from fuel is introduced into the ammonium sulfate crystallization section, crystalline ammonium sulfate can be produced, which is particularly ecological. This product is also called "Eco ammonium sulfate crystals" herein. It is a well-known problem that evaporative crystallization of ammonium sulfate consumes a lot of energy, and in particular fuel and therefore green-house gases etc. The invention provides the possibility to produce Eco ammonium sulfate crystals without this disadvantage. Accordingly, the invention is also directed the ammonium sulfate crystals obtainable by the process of the invention.

The present invention will be more fully explained with reference to the following drawings.

FIG. 1 illustrates three examples of Beckmann rearrangement reaction sections, consisting of one or more stages in series, that are charged with both cyclohexanone oxime and oleum and/or sulfuric acid, and in which a mixture comprising ε-caprolactam is formed and in which heat of reaction is generated.

FIG. 1a illustrates an example of a single-stage Beckmann rearrangement reaction section. The single-stage Beckmann rearrangement reaction section comprises mixing device [K1], collecting vessel [L1], pump [M1] and one or more heat exchangers [N1]. A first mixture comprising ε-caprolactam is kept in circulation via line [101]. Cyclohexanone oxime and oleum (a mixture of sulfuric acid and $SO_3$) are fed via lines [102] and [103], respectively. Heat is transferred from the mixture comprising ε-caprolactam in one or more heat exchangers [N1] to cooling water which enters the one or more heat exchangers via line [105] and heated water is discharged via line [106]. Via line [104] a fraction of the first mixture comprising ε-caprolactam is withdrawn from the collecting vessel [L1] and fed into a neutralization section (not shown in FIG. 1a).

Figure 1B:
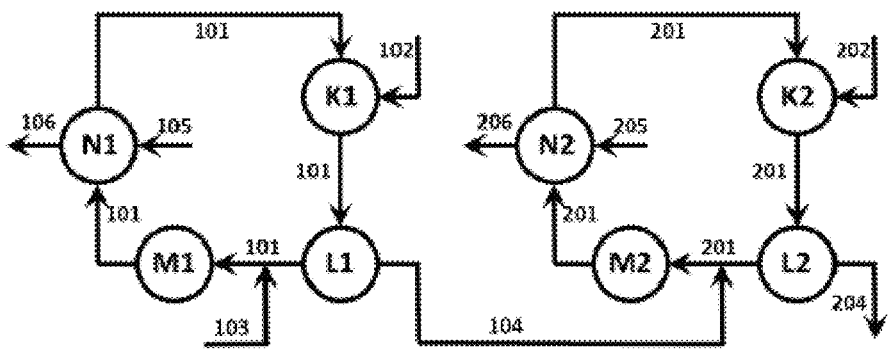
FIG. 1b is a schematic diagram illustrating an example of a two-stage Beckmann rearrangement reaction section as described below.

FIG. 1B illustrates an example of a two-stage Beckmann rearrangement reaction section. The first stage of the two-stage Beckmann rearrangement reaction section is essentially analogous to the single-stage Beckmann rearrangement reaction section that is illustrated in FIG. 1a, except that the fraction of the first mixture comprising ε-caprolactam that is withdrawn from the collecting vessel [L1] via line [104] is not fed into a neutralization section, but is fed to the second stage of the two-stage Beckmann rearrangement reaction section. The second stage of the two-stage Beckmann rearrangement reaction section comprises mixing device [K2], collecting vessel [L2], pump [M2] and one or more heat exchangers [N2]. A second mixture comprising ε-caprolactam is kept in circulation via line [201]. Cyclohexanone oxime is fed via line [202]. Heat is transferred from the mixture comprising ε-caprolactam in one or more heat exchangers [N2] to cooling water which enters the one or more heat exchangers via line [205] and heated water is discharged via line [206]. Via line [204] a fraction of the second mixture comprising ε-caprolactam is withdrawn from the collecting vessel [L2] and fed into a neutralization section (not shown in FIG. 1B).

Figure 1C:
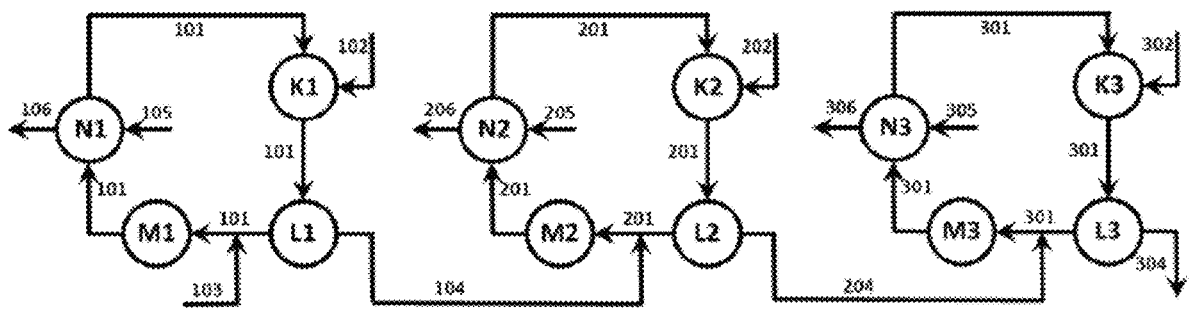
FIG. 1c is a schematic diagram illustrating an example of a three-stage Beckmann rearrangement reaction section as described below.

FIG. 1c illustrates an example of a three-stage Beckmann rearrangement reaction section. The first stage and second stage of the three-stage Beckmann rearrangement reaction section are essentially analogous to the two-stage Beckmann rearrangement reaction section that is illustrated in FIG. 1B, except that the fraction of the second mixture comprising ε-caprolactam that is withdrawn from the collecting vessel [L2] via line [204] is not fed into a neutralization section, but is fed to the third stage of the three-stage Beckmann rearrangement reaction section. The third stage of the three-stage Beckmann rearrangement reaction section comprises mixing device [K3], collecting vessel [L3], pump [M3] and one or more heat exchangers [N3]. A third mixture comprising ε-caprolactam is kept in circulation via line [301]. Cyclohexanone oxime is fed via line [302]. Heat is transferred from the mixture comprising ε-caprolactam in one or more heat exchangers [N3] to cooling water which enters the one or more heat exchangers via line [305] and heated water is discharged via line [306]. Via line [304] a fraction of the third mixture comprising ε-caprolactam is withdrawn from the collecting vessel [L3] and fed into a neutralization section (not shown in FIG. 1c).

FIG. 2 illustrates two examples of an embodiment of evaporative type crystallization for the production of ammonium sulfate crystals that are charged with ammonium sulfate feed solutions.

Figure 2A:
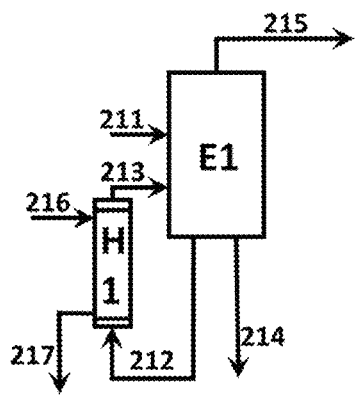
FIG. 2a is a schematic diagram illustrating an example of a single-effect evaporative crystallization system for producing ammonium sulfate crystals as described below.

FIG. 2a depicts an embodiment of a single-effect evaporative type crystallization for the production of ammonium sulfate crystals.

The ammonium sulfate feed solution is charged via line [211] to evaporative crystallizer [E1]. Via line [212] an ammonium sulfate slurry or solution is discharged from to evaporative crystallizer [E1] and is charged to heat exchanger [H1]. In heat exchanger [H1] the ammonium sulfate slurry or solution is heated. The heated ammonium sulfate slurry or solution is discharged from the heat exchanger [H1] and is charged to the evaporative crystallizer [E1] via line [213]. An ammonium sulfate slurry is discharged from evaporative crystallizer [E1] to a centrifuge (not shown) for recovering of ammonium sulfate crystals via line [214]. Water vapor is discharged from the evaporative crystallizer [E1] and is charged to a condenser (not shown) via line [215]. Heat exchanger [H1] is heated with steam that is charged via line [216] and the steam condensate is discharged from heat exchanger [H1] via line [217].

Figure 2B:
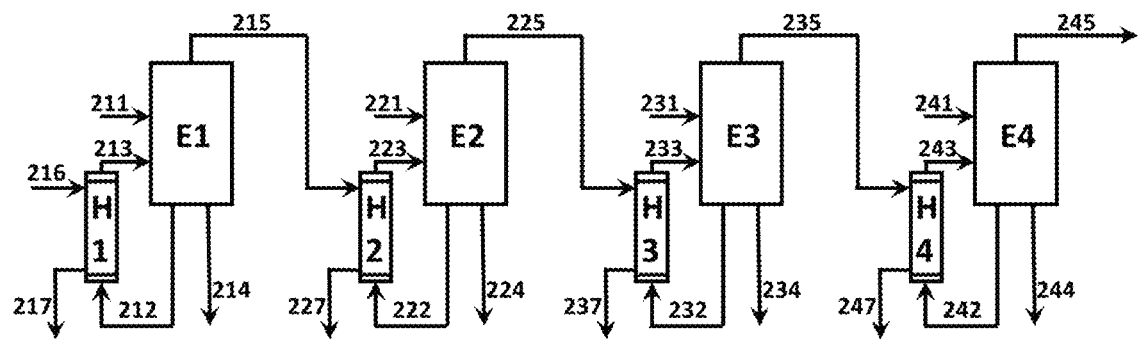
FIG. 2b is a schematic diagram illustrating an example of a four-effect evaporative crystallization system for producing ammonium sulfate crystals as described below.

FIG. 2b depicts an embodiment of a four-effect evaporative type crystallization for the production of ammonium sulfate crystals. The first effect is heated directly with steam, the water vapors that are discharged from the first evaporative crystallizer are used to heat the second effect. The vapors from the second effect are used to heat the third effect. The vapors from the third effect are used to heat the fourth effect. The vapors from the fourth effect are charged to a condenser (not shown) and removed from the system.

The ammonium sulfate feed solutions are charged via lines [211], [221], [231] and [241] to evaporative crystallizers [E1], [E2], [E3] and [E4], respectively. Via lines [212], [222]. [232] and [242] ammonium sulfate slurries or solutions are discharged from to evaporative crystallizers [E1], [E2], [E3] and [E4], respectively, and are charged to heat exchangers [H1], [H2], [H3] and [H4], respectively. In heat exchangers [H1], [H2], [H3] and [H4], the ammonium sulfate slurries or solutions are heated. The heated ammonium sulfate slurries or solutions are discharged from the heat exchangers [H1], [H2], [H3] and [H4] and are charged to the evaporative crystallizers [E1], [E2], [E4] and [E4], respectively, via lines [213], [223], [233] and [243], respectively. Ammonium sulfate slurries are discharged from evaporative crystallizers [E1], [E2], [E3] and [E4] to one or more centrifuges (not shown) for recovering of ammonium sulfate crystals via line [214], [224], [234] and [244], respectively. Water vapor is discharged from the evaporative crystallizers [E1], [E2] and [E3] and is charged to heat exchangers [H2], [H3] and [H4], respectively, via lines [215], [225] and [235], respectively. Condensate is discharged from heat exchangers [H2], [H3] and [H4] via lines [227], [237] and [247], respectively. Water vapor is discharged from the evaporative crystallizer [E4] and is charged to a condenser (not shown) via line [245]. Heat exchanger [H1] is heated with steam that is charged via line [216] and the steam condensate is discharged from heat exchanger [H1] via line [217].

Figure 3:
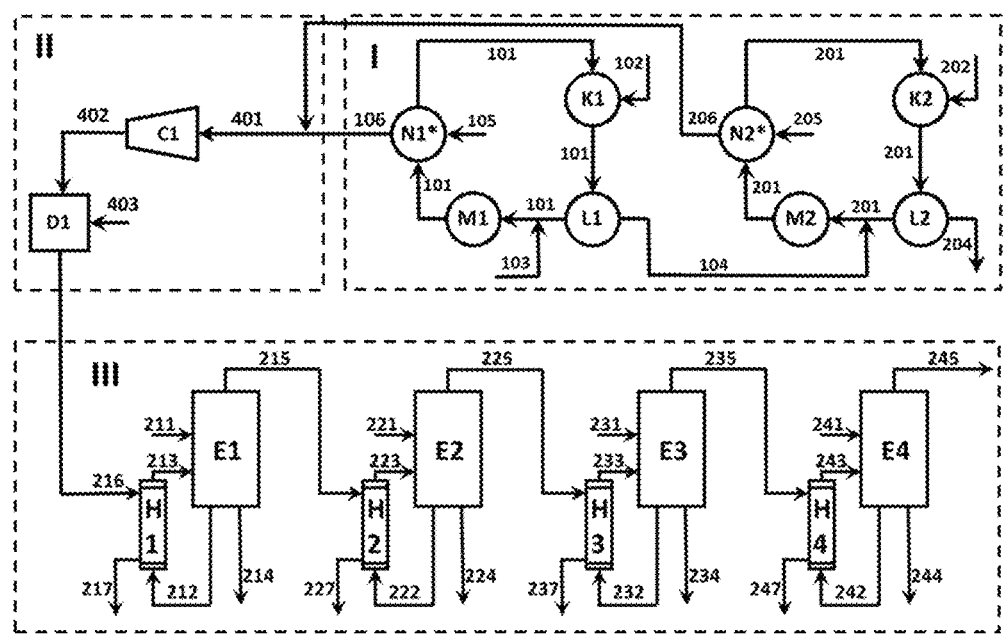
FIG. 3 is a schematic diagram illustrating an example of an apparatus combining a Beckmann rearrangement reaction section, a vapor compression and de-superhearing section, and an ammonium sulfate crystallization section as described below.

FIG. 3 illustrates an example of an apparatus consisting of three sections:

A Beckmann rearrangement reaction section [I], consisting of two stages in series, that are charged with both cyclohexanone oxime and oleum and/or sulfuric acid, and in which a mixture comprising containing ε-caprolactam is formed and discharged, and in which heat of reaction is generated. A part of this heat of reaction is used to produce vapor and is discharged from this section.

A compression/de-superheating section [II] that is charged with the vapor that is produced in the two-stage Beckmann rearrangement reaction section and with water for de-superheating of the compressed vapor. A de-superheated vapor is discharged from this section.

An embodiment [III] comprising of four evaporative crystallization units for the production of ammonium sulfate crystals that is operated in a multiple-effect configuration. Ammonium sulfate feed solution are charged to and ammonium sulfate slurries are discharged from the four evaporative crystallization units. De-superheated vapor that is discharged from the compression/de-superheated section is charged to this embodiment [III].

Two-stage Beckmann rearrangement reaction section [I] is essentially analogous to the two-stage Beckmann rearrangement reaction section that is illustrated in FIG. 1B, except that heat exchangers [N1*] and [N2*] are designed for the production of vapor. Heat is transferred from the mixtures comprising ε-caprolactam in the one or more heat exchangers [N1*] and [N2*] to an intermediate heat transfer fluid. As intermediate heat transfer fluid water is used that has a low content of solids and ions (e.g., steam condensate or deionized water). This water enters the one or more heat exchangers [N1*] and [N2*] via lines [105] and [205], respectively. In the one or more heat exchangers [N1*] and [N2*] the water is evaporated and the resulting vapor is discharged via lines [106] and [206], respectively.

In compression/de-superheating section [II] the vapor transportation lines [106] and [206] are combined to line [401] and the transported vapor is charged to one or more devices to increase its temperature via vapor compression [C1] (e.g., thermal vapor compressors, mechanical vapor compressors, high-speed centrifugal compressors, fans or combinations thereof). The compressed vapor, which is superheated, is discharged from the one or more devices for vapor compression [C1] and is charged to de-superheating station [D1] via line [402]. Water that has a low content of solids and ions (e.g., steam condensate), is charged to de-superheating station [D1] via line [403]. In de-superheating station [D1] de-superheated vapor is obtained with a reduced level of superheating compared to the level of superheating of the vapor that was charged via line [402]. The de-superheated vapor obtained in de-superheating station [D1] is discharged via line [216]. Optionally, part of the vapor in the transport lines [106], [206] and/or [401] is not charged to one or more devices for vapor compression [C1], however, it is discharged to another application (not shown in FIG. 3). Sections [C1] and [D1] are optional.

Ammonium sulfate crystallization section [III] comprises four evaporative crystallization units for the production of ammonium sulfate crystals. It is essentially analogous to the embodiment that is illustrated in FIG. 2b, except that heat exchanger [H1] is not charged with external steam from a natural gas fired boiler house, but with the de-superheated vapor obtained in de-superheating station [D1] via line [216]. Optionally, a part of the de-superheated vapor obtained in de-superheating station [D1] is not discharged to section [III], but to another application (not shown in FIG. 3).

The present invention is illustrated by but not limited to the following examples.

The Examples and the Comparative Examples were carried out in industrial-scale continuously operating plants, in which both ε-caprolactam and crystalline ammonium sulfate are produced.

COMPARATIVE EXAMPLE 1

On an industrial site, cyclohexanone oxime was produced by both the 'Raschig process' and the 'HPO® process'. The cyclohexanone oxime that was produced by the 'HPO® process' had a water content of less than 0.1 wt. %. The cyclohexanone oxime that was produced by the 'Raschig process' had a water content of ca. 4.5 wt. %. Cyclohexanone oxime and oleum were fed to a two-stage Beckmann rearrangement reaction section. A plant setup as described in FIG. 1B was used. Heat produced in the two-stage Beckmann rearrangement reaction section was transferred to cooling water via indirect heat exchangers. The reaction mixture comprising containing ε-caprolactam obtained in the second stage of the Beckmann rearrangement reaction section was discharged from the Beckmann rearrangement reaction section to a neutralization section to which aqueous ammonia was also charged. In the neutralization section, a two-phase system (an aqueous ammonium sulfate phase and an aqueous ε-caprolactam phase) was obtained. The aqueous ε-caprolactam phase was in a countercurrent extraction column extracted with benzene, producing a caprolactam-benzene mixture. ε-Caprolactam was recovered in a continuous mode from this caprolactam-benzene mixture in a countercurrent extraction column extracted with water, producing a caprolactam-water mixture. First grade ε-caprolactam was obtained from this caprolactam-water mixture after purification (incl. ion-exchange treatment and distillation steps) that could be used for all commercial applications of ε-caprolactam.

About 15 ton/hr cyclohexanone oxime was fed to the first stage of the Beckmann rearrangement reaction section via line [102]. This cyclohexanone oxime was a mixture of cyclohexanone oxime that is produced by the 'Raschig process' and of cyclohexanone oxime that is produced by the 'HPO® process'. About 4 ton/hr cyclohexanone oxime with a water content of less than 0.1 wt. % that is produced by the HPO® process' was charged to the second stage of the Beckmann rearrangement reaction section via line [202]. About 19 ton/hr oleum (a mixture of sulfuric acid and SO$_3$) was fed via line [103].

The temperatures of the mixtures comprising ε-caprolactam exiting mixing devices [K1] and [K2] were about 112° C. and about 110° C., respectively. The temperatures of the mixtures comprising ε-caprolactam exiting mixing shell and tube heat exchangers [N1] and [N2] were about 87° C. and about 85° C., respectively. The temperatures of the heated cooling water discharged from shell and tube heat exchangers [N1] and [N2] were both about 45° C.

The flow rates of the cooling water charged to shell and tube heat exchangers [N1] and [N2] were about 400 m³/hr and about 100 m³/hr, respectively.

The molar ratios M(1) and M(2) of the reaction mixtures comprising ε-caprolactam exiting the first stage and the second stage were about 1.6 and about 1.27, respectively.

The overall caprolactam yield (=molar ratio of ε-caprolactam exiting the second stage:cyclohexanone oxime fed to first stage and second stage) of the two-stage Beckmann rearrangement reaction section was well above 99%.

Comparative Example 1 shows that it is possible to produce, on an industrial scale, first-grade ε-caprolactam by feeding cyclohexanone oxime and oleum to a two-stage Beckmann rearrangement reaction section, whereby the reaction mixture comprising ε-caprolactam obtained in the second stage of the Beckmann rearrangement reaction section is discharged from the Beckmann rearrangement reaction section and worked-up as described above. The flows of cooling water that were charged to indirect heat exchangers [N1] and [N2] in order to control the reaction by removing heat produced in both sections of the two-stage Beckmann rearrangement reaction section were each about 30 m³ cooling water per ton charged cyclohexanone oxime.

COMPARATIVE EXAMPLE 2

On an industrial site, cyclohexanone oxime was produced according by both the 'Raschig process' and the 'HPO® process' from cyclohexanone produced via hydrogenation of phenol. The cyclohexanone oxime of both processes was converted into ε-caprolactam in a multi-stage Beckmann rearrangement process with oleum. The obtained ε-caprolactam was recovered after neutralization with aqueous ammonia. In the cyclohexanone oxime formation step in the 'Raschig process' as well as in the neutralization step after the Beckmann rearrangement, aqueous ammonia was used for neutralization. As a result, two types of aqueous ammonium sulfate solutions were obtained as by-product.

The aqueous ammonium sulfate solution obtained in the cyclohexanone oxime formation step in the 'Raschig process' was comprised of roughly:

| | |
|---|---|
| Ammonium sulfate | ca. 43 wt. % |
| Water | ca. 55 wt. % |
| Ammonium nitrate | ca. 2 wt. % |

The aqueous ammonium sulfate solution obtained in the neutralization step after the Beckmann rearrangement was comprised of roughly:

| | |
|---|---|
| Ammonium sulfate | ca. 43 wt. % |
| Water | ca. 57 wt. % |

In addition, both aqueous ammonium sulfate solutions comprised some minor organic impurities. The concentration of organic impurities was determined by measuring the COD (chemical oxygen demand) content according to ASTM D 1252-95 (dichromate method).

By addition of aqueous ammonia (about 25 wt. %), the pH value of both ammonium sulfate solutions were increased to about 5 (as determined at a temperature of 25° C.).

The resulting solutions were fed to an ammonium sulfate crystallization section in the plant comprising a line of four evaporative crystallization units, that was operated in a multiple-effect configuration and whereby only fresh steam was charged to the first evaporative crystallization unit. The line of four evaporative crystallization units was as depicted in FIG. 2b.

To evaporative crystallizers [E1] and [E2] the pH-adjusted aqueous ammonium sulfate solution obtained in the cyclohexanone oxime formation step in the 'Raschig process' was fed via lines [211] and [221], respectively. The pH-adjusted aqueous ammonium sulfate solution obtained in the neutralization step after the Beckmann rearrangement was fed to evaporative crystallizers [E3] and [E4] via lines [231] and [241], respectively. To each crystallization section roughly a similar amount of ammonium sulfate solution was fed.

The evaporative crystallizers [E1], [E2], [E3] and [E4] were operated at a temperature of about 101° C., about 84° C., about 65° C. and about 48° C., respectively. All crystallizers were Oslo-type crystallizers.

The amount of fresh steam that was fed via line [216] to heat exchanger [H1] was about 22 ton/hr. This fresh steam was generated in a boiler house, which burns as nonrenewable (fossil) natural gas as fuel.

By purging aqueous ammonium sulfate solution, the ammonium nitrate levels in clear solution in the evaporative crystallizers [E1] and [E2] were kept at levels of approximately 35 wt. %. By purging aqueous ammonium sulfate solution, COD levels in the evaporative crystallizers [E3] and [E4] were kept at levels of approximately 40 gram per kg clear solution, respectively.

From each evaporative crystallizers [E3] and [E4], ammonium sulfate solution containing ammonium sulfate crystals was discharged and fed to a centrifuge in which the ammonium sulfate crystals were separated from mother liquor and were washed with some water. Then the obtained washed ammonium sulfate crystals were dried. The colour of the resulting ammonium sulfate crystals was white.

The production capacity of ammonium sulfate crystals of each crystallization unit was about 15 ton/hr and, accordingly, the combined capacity of ammonium sulfate crystals of the line of four evaporative crystallization units was about 60 ton/hr.

Comparative Example 2 shows that it is possible to produce, on an industrial scale, ammonium sulfate crystals by feeding ammonium sulfate solutions, that are co-produced in chemical plants for the production of caprolactam and its intermediates, to an ammonium sulfate crystallization plant comprising a line of four evaporative crystallization units, that was operated in a multiple-effect configuration and whereby only fresh steam was charged to the first evaporative crystallization unit. The amount of fresh steam that needed to be charged to heat exchanger [H1] of the first evaporative crystallization unit was about 0.37 ton steam per ton crystalline ammonium sulfate.

EXAMPLE 1

In this example an apparatus as described in FIG. 3 was used.

The apparatus consists of three sections:

A two-stage Beckmann rearrangement reaction section, in which heat of reaction is produced. This apparatus is similar to the one used in Comparative Example 1, except that the shell and tube heat exchangers [N1] and [N2] were replaced by falling film type shell and tube heat exchangers [N1*] and [N2*], respectively. And neither cooling water was charged to the heat exchangers [N1*] and [N2*] nor heated cooling water was discharged from the heat exchangers [N1*] and [N2*]. In this Example, water (condensate) was charged to the new heat exchangers [N1*] and [N2*], and vapor was discharged from the new heat exchangers [N1*] and [N2*].

A compression/de-superheating section that was charged with the vapor that was produced in the two-stage Beckmann rearrangement reaction section and with water (condensate) for de-superheating of the compressed vapor. A de-superheated vapor is discharged from this section.

An ammonium sulfate crystallization plant comprising of four evaporative crystallization units, that was operated in a multiple-effect configuration as described in Comparative Example 2, except that no fresh steam was charged to heat exchanger [H1] of the first evaporative crystallization unit of the ammonium sulfate crystallization plant. In this Example a part of the de-superheated vapor that was discharged from the compression/de-superheated section was charged to the heat exchanger [H1].

On an industrial site, cyclohexanone oxime was produced by both the 'Raschig process' and the 'HPO® process'. The cyclohexanone oxime that was produced by the 'HPO® process' had a water content of less than 0.1 wt. %. The cyclohexanone oxime that was produced by the 'Raschig process' had a water content of ca. 4.5 wt. %. Cyclohexanone oxime and oleum were fed to a two-stage Beckmann rearrangement reaction section. A plant as described in FIG. 1B was used. Heat produced in both stages of the two-stage Beckmann rearrangement reaction section was transferred to water (steam condensate) that was heated-up and vaporized in falling film type indirect heat exchangers. The reaction mixture comprising ε-caprolactam obtained in the second stage of the Beckmann rearrangement reaction section was discharged from the Beckmann rearrangement reaction section to a neutralization section to which aqueous ammonia was also charged. In the neutralization section a two-phase system (an aqueous ammonium sulfate phase and an aqueous ε-caprolactam phase) was obtained. The aqueous ε-caprolactam phase was in a countercurrent extraction column extracted with benzene, producing a caprolactam-benzene mixture. ε-Caprolactam was recovered in a continuous mode from this caprolactam-benzene mixture in a countercurrent extraction column extracted with water, producing a caprolactam-water mixture. First grade ε-caprolactam was obtained from this caprolactam-water mixture after purification (incl. ion-exchange treatment and distillation steps) that could be used for all commercial applications of ε-caprolactam.

About 30 ton/hr cyclohexanone oxime were fed to the first stage of the Beckmann rearrangement reaction section via line [102]. This cyclohexanone oxime was a mixture of cyclohexanone oxime that is produced by the 'Raschig process' and of cyclohexanone oxime that is produced by the 'HPO® process', About 7.5 ton/hr cyclohexanone oxime with a water content of less than 0.1 wt. % that was produced by the 'HPO® process' was charged to the second stage of the Beckmann rearrangement reaction section via line [202]. About 38 ton/hr oleum (a mixture of sulfuric acid and $SO_3$) was fed via line [103].

The temperatures of the mixtures comprising ε-caprolactam exiting mixing devices [K1] and [K2] were about 112° C. and about 110° C., respectively. The temperatures of the mixtures comprising ε-caprolactam exiting shell and tube heat exchangers [N1*] and [N2*] were about 87° C. and about 85° C., respectively. The temperature and pressure of the steam discharged from falling film type shell and tube heat exchangers [N1] and [N2] were about 85° C. and about 0.6 bar, respectively.

The flow rate of the water (condensate) charged to shell and tube heat exchanger [N1] was 13.8 m³/hr. The flow rate of the cooling water charged to shell and tube heat exchanger [N2] was 3.6 m³/hr.

The molar ratios M(1) and M(2) of the reaction mixtures comprising ε-caprolactam exiting the first stage and the second stage were about 1.6 and about 1.27, respectively.

The overall caprolactam yield (=molar ratio of ε-caprolactam exiting the second stage to cyclohexanone oxime fed to first stage and second stage) of the two-stage Beckmann rearrangement reaction section was well above 99%.

The water vapor flow which was drawn off from the shell and tube heat exchanger [N1] was brought to a higher temperature level initially by means of mechanical vapor compression (MVC). The compression was achieved by three fans arranged in series. Superheated steam was produced, which was subsequently de-superheated by addition of water (condensate), whereby the temperature of the steam was reduced to about 120° C. The pressure of the de-superheated steam was about 1.2 bar.

About 22 ton/hr of the resulting de-superheated steam flow was fed via line [216] to heat exchanger [H1] of the first evaporative crystallization unit of the ammonium sulfate crystallization plant comprising a line of four evaporative crystallization units, that was operated in a multiple-effect configuration as described in Comparative Example 2. The rest of the produced de-superheated steam flow was used for other applications. It was not necessary to feed any fresh steam (i.e., generated by a fuel-driven boiler house) to heat exchanger [H1] via line [216].

The colour of the resulting ammonium sulfate crystals was white.

The production capacity of ammonium sulfate crystals of each crystallization unit was about 15 ton/hr (thus, the combined capacity of ammonium sulfate crystals of the line of four evaporative crystallization units was about 60 ton/hr).

Example 1 shows that heat produced in a Beckmann rearrangement reaction section can very efficiently be utilized as heat source in an evaporative-type crystallization plant for the production of ammonium sulfate crystals. Heat produced in the first stage of a Beckmann rearrangement reaction section is utilized as heat source of the first effect of a four-effect evaporative type crystallization plant for the production of ammonium sulfate crystals. The production capacity of ammonium sulfate crystals of each crystallization unit remained at the same level as in the Comparative Example 2 (being for each crystallization unit about 15 ton/hr and about 60 ton/hr for the whole line of four evaporative crystallization units). The first effect of the four-effect evaporative type crystallization plant did not need any steam from an external (in particular fuel-based) source. The produced ammonium sulfate crystals can be characterized as eco ammonium sulfate crystals, because they were produced without any heat originating from fossil (non-renewable) fuel being used for heating in the ammonium sulfate crystallization section.

In addition, introducing the heat exchange according to the invention completely mitigated the need to use cooling water in the cooler of the first stage of the three-stage Beckmann rearrangement reaction section. Accordingly, the process of the Example 1 does not require cooling water to be applied to the first stage of the Beckmann rearrangement reaction section.

The invention claimed is:

1. Process for the production of ε-caprolactam and crystalline ammonium sulfate in an industrial-scale plant, wherein the plant comprises a Beckmann rearrangement reaction section, an ammonium sulfate crystallization section, and one or more heat exchangers configured to transfer heat from the Beckmann rearrangement reaction section to the ammonium sulfate crystallization section, wherein the process comprises the steps of:
   a) feeding
      (i) cyclohexanone oxime and
      (ii) oleum and/or sulfuric acid
      to the Beckmann rearrangement reaction section;
   b) reacting components (i) and (ii) in the Beckmann rearrangement reaction section to form a reaction mixture comprising 8-caprolactam, whereby heat of reaction is generated;
   c) discharging the reaction mixture comprising &-caprolactam from the Beckmann rearrangement reaction section;
   d) removing partially or fully the heat of reaction generated in the Beckmann rearrangement reaction section by one or more heat exchangers configured to transfer heat from the Beckmann rearrangement reaction section;
   e) feeding an aqueous liquid comprising ammonium sulfate to the ammonium sulfate crystallization section;
   f) introducing heat into the ammonium sulfate crystallization section comprising the aqueous ammonium-sulfate-comprising liquid by one or more heat exchangers configured to transfer heat into the ammonium sulfate crystallization section;
   g) forming ammonium sulfate crystals by evaporative crystallization in the ammonium sulfate crystallization section; and
wherein
   h) the heat of reaction removed from the Beckmann rearrangement reaction section in step d) is at least partially or fully transferred to the ammonium sulfate crystallization section in step f) using an intermediate heat transfer fluid, wherein the intermediate heat transfer fluid, after being at least partially evaporated in the one or more heat exchangers in step d), is de-superheated by the addition of intermediate heat transfer fluid condensate before entering the one or more heat exchangers in step f).

2. Process according to claim 1, wherein the intermediate heat transfer fluid is water.

3. Process according to claim 1, wherein the intermediate heat transfer fluid is at least partially condensed in the one or more heat exchangers configured to transfer heat into the ammonium sulfate crystallization section.

4. Process according to claim 1, wherein during the transfer of the heat of reaction in step h), the temperature of the intermediate heat transfer fluid coming from the one or more heat exchangers recited in step d) is further increased before it enters the one or more heat exchangers recited in step f).

5. Process according to claim 4, wherein the further increase in temperature of the intermediate heat transfer fluid is achieved by one or more of the following:
   a) thermal vapor compression,
   b) mechanical vapor compression,
   c) one or more high-speed centrifugal compressors and/or
   d) one or more fans arranged in series.

6. Process according to claim 4, wherein the intermediate heat transfer fluid after the further increase in temperature, but before it enters the one or more heat exchangers recited in step f), is de-superheated partially or fully.

7. Process according to claim 1, wherein the temperature of the heat transfer fluid that is charged to the one or more heat exchangers configured to transfer heat into the ammonium sulfate crystallization section is from 55° C. to 150° C.

8. Process according to claim 1, wherein the pressure of the heat transfer fluid that is charged to the one or more heat exchangers configured to transfer heat into the ammonium sulfate crystallization section is from 1 kPa to 1 MPa.

9. Process according to claim 1, wherein the Beckmann rearrangement reaction section is a multiple-stage Beckmann rearrangement reaction section and the heat of reaction removed from the Beckmann rearrangement reaction section in step d) is removed from the first stage of the Beckmann rearrangement reaction section.

10. Process according to claim 1, wherein the ammonium sulfate crystallization section comprises two or more evaporative crystallization units operating at different temperatures, and wherein in step f) the heat is introduced into the evaporative crystallization unit that is operated at the highest temperature.

11. Process according to claim 1, wherein no heat originating from fuel is introduced by the one or more heat exchangers configured to transfer heat into the ammonium sulfate crystallization section.

* * * * *